US010118694B2

United States Patent
Ferrant et al.

(10) Patent No.: US 10,118,694 B2
(45) Date of Patent: Nov. 6, 2018

(54) ROTORCRAFT ROTOR COMPRISING A HUB MADE OF COMPOSITE MATERIALS OBTAINED FROM CARBON FIBER FABRIC DUSTED IN A THERMOPLASTIC RESIN

(71) Applicant: AIRBUS HELICOPTERS, Marignane (FR)

(72) Inventors: Matthieu Ferrant, Aix en Provence (FR); Stephane Mazet, Rognac (FR)

(73) Assignee: AIRBUS HELICOPTERS, Marignane (FR)

( * ) Notice: Subject to any disclaimer, the term of this patent is extended or adjusted under 35 U.S.C. 154(b) by 494 days.

(21) Appl. No.: 14/989,142

(22) Filed: Jan. 6, 2016

(65) Prior Publication Data
US 2016/0200433 A1     Jul. 14, 2016

(30) Foreign Application Priority Data

Jan. 8, 2015 (FR) ..................... 15 00021

(51) Int. Cl.
*B64C 27/39* (2006.01)
*B64C 27/48* (2006.01)

(52) U.S. Cl.
CPC .............. *B64C 27/39* (2013.01); *B64C 27/48* (2013.01)

(58) Field of Classification Search
CPC ......... B64C 27/32; B64C 27/35; B64C 27/37; B64C 27/39; B64C 27/48
See application file for complete search history.

(56) References Cited

U.S. PATENT DOCUMENTS

| 4,425,082 A | 1/1984 | Mussi et al. |
| 4,568,244 A | 2/1986 | Wehnert et al. |
| 4,714,409 A | 12/1987 | Denison et al. |
| 4,818,179 A | 4/1989 | Toner et al. |
| 4,915,585 A | 4/1990 | Guimbal |

(Continued)

FOREIGN PATENT DOCUMENTS

| CN | 1053401 A | 7/1991 |
| CN | 101583535 A | 11/2009 |

(Continued)

OTHER PUBLICATIONS

French Search Report for French Application No. FR 1500021, Completed by the French Patent Office on Nov. 9, 2015, 8 Pages.

(Continued)

*Primary Examiner* — Richard Edgar
(74) *Attorney, Agent, or Firm* — Brooks Kushman P.C.

(57) ABSTRACT

A rotorcraft rotor comprising a hub made up of a monolithic body of composite material obtained by stacking successive layers of carbon fiber fabric dusted with a thermoplastic resin and compressed while hot. The hub is provided with branches on which respective blades are mounted via hinge systems, each including a strength member bearing radially against a corresponding branch. The strength members are individually received in sockets defined on fabrication so that when the rotor is set into rotation at a predefined operating speed, the radial thrust seat for enabling the strength members to bear against the branches present bearing surfaces that are cylindrical, the radial thrust seats then being of shape complementary to a cylindrical bearing surface of the corresponding strength member.

18 Claims, 2 Drawing Sheets

(56) References Cited

U.S. PATENT DOCUMENTS

| | | | |
|---|---|---|---|
| 5,141,398 A * | 8/1992 | Bietenhader | B64C 27/51 |
| | | | 416/107 |
| 5,478,204 A | 12/1995 | Desjardins et al. | |
| 8,147,198 B2 | 4/2012 | Baskin | |
| 2008/0292468 A1 | 11/2008 | Stamps et al. | |
| 2011/0116936 A1 | 5/2011 | Hiros et al. | |

FOREIGN PATENT DOCUMENTS

| | | |
|---|---|---|
| EP | 0120803 | 10/1984 |
| EP | 0221678 | 5/1987 |
| EP | 0340095 | 11/1989 |
| FR | 2653405 | 4/1991 |
| GB | 2092541 | 8/1982 |

OTHER PUBLICATIONS

First Office Action for Chinese Application No. 201610010031.4, dated May 27, 2017, 5 Pages.

\* cited by examiner fig.2 fig.3

ROTORCRAFT ROTOR COMPRISING A HUB MADE OF COMPOSITE MATERIALS OBTAINED FROM CARBON FIBER FABRIC DUSTED IN A THERMOPLASTIC RESIN

CROSS REFERENCE TO RELATED APPLICATION

This application claims priority to French patent application No. FR 15 00021 filed on Jan. 8, 2015, the disclosure of which is incorporated in its entirety by reference herein.

BACKGROUND OF THE INVENTION (1) Field of the Invention

The present application relates to the field of rotorcraft, and it relates more specifically to a rotorcraft rotor comprising a hub made of composite material with the blades of the rotary wing of said rotor being mounted on the hub.

More specifically, the invention provides a rotorcraft rotor comprising a hub made of composite materials with the blades of the rotary wing of said rotor being mounted thereon.

(2) Description of Related Art

Rotorcraft are rotary wing aircraft having at least one rotor, including at least one main rotor of substantially vertical axis that provides the rotorcraft at least with lift.

In the specific context of a helicopter, said at least one main rotor provides the rotorcraft not only with lift, but also with propulsion in any direction of advance. The flight attitude of the helicopter may be modified by a pilot of the rotorcraft causing the pitch of the blades making up the rotary wing of the main rotor to vary cyclically and/or collectively.

Rotorcraft are also fitted with an anti-torque device providing with them with guidance in yaw, such as in particular at least one auxiliary rotor having a substantially horizontal axis. By way of example, such an auxiliary rotor may be a tail rotor or it may be formed by a propulsive propeller in the context of a helicopter having a high forward speed.

The blades of a rotorcraft rotor are conventionally mounted on a hub for driving them in rotation. The hub is mounted on a rotary shaft such as a mast for a main rotor, the shaft being driven in rotation by a power plant that supplies the mechanical power needed for operation of the rotorcraft.

Furthermore, the blades are individually mounted on the hub so as to be movable at least about a pitch variation axis, so as to enable a pilot of the rotorcraft to vary their pitch at least collectively, and possibly also cyclically, in order to modify the flight attitude of the rotorcraft.

With reference more particularly to a main rotor, the blades are mounted not only to be capable of pivoting about their pitch variation axis, but they are also commonly mounted to be movable with lead/lag motion and with flapping motion.

Under such circumstances, the blades are mounted more particularly so as to be movable relative to the hub not only about their pitch variation axes, but also about respective flapping axes oriented parallel to the general plane of a blade in question, i.e. mainly perpendicularly to the orientation of the plane of rotation of the hub, and about a respective lead/lag axis oriented perpendicularly to the general plane of the blade in question, i.e. mainly parallel to the orientation of the axis of rotation of the hub.

Concerning the orientations of the flapping axis and of the lead/lag axis, the main orientation specified relative to the orientation of the axis of rotation of the hub should typically be assessed relative to the ability of the blade to move in its own general plane about its various movement axes relative to the hub.

In this context, the mechanical strength of the hub of a rotorcraft rotor is naturally selected to withstand the forces that it needs to withstand in operation. Such forces are the result in particular not only of the centrifugal force generated by driving the rotor in rotation, but also of the freedom of the blades to move relative to the hub, at least about their pitch variation axes and possibly also, for a main rotor, about their flapping axes and about their lead/lag axes.

Traditionally, the hub of a rotorcraft rotor is made of a piece of metal.

Nevertheless, such a metal structure for the hub tends to give it considerable weight, and it is appropriate to reduce weight in the field of aviation. Furthermore, a metal hub needs to be machined in order to receive appropriately the various members providing the connection between the hub and the rotary shaft and also the movable connections between the blades and the hub.

It can thus be seen that although such a metal hub is satisfactory compared with respect to its function and in particular its strength, it nevertheless presents the drawbacks of being heavy for given volume, and expensive to obtain.

Such drawbacks can be limited in the specific context of a hub having flexible branches on which the blades are mounted so as to enable them to be movable relative to the hub. In this context, it is known to make a rotorcraft rotor hub out of composite materials that are made up of stacks of layers of mineral fiber fabric impregnated with a thermosetting resin.

Thus, the Document EP 2 234 880, equivalent to Document US 2011/116936, and Document U.S. Pat. No. 8,147,198, disclose a composite material yoke forming the hub of a rotorcraft rotor and its method of fabrication. Said yoke is made of layers of glass fiber fabric impregnated with a thermosetting resin and it includes respective blade-carrier branches.

The composite materials from which the yoke is made are used to advantage for providing the blades with freedom to move in flapping. More particularly, localized weakening of the branches of the yoke impart flexibility in flapping to the branches.

Proposals are also made in Document EP 0 221 678, equivalent to Document U.S. Pat. No. 4,714,409, to provide a rotorcraft rotor hub in which flexible branches for connecting the blades to the hub are made out of a resin having reinforcing plates embedded therein, which plates are made of composite materials. The composite materials used for forming flexible branches, or indeed the entire hub, are formed more specifically from layers of carbon fiber fabric impregnated with a thermosetting resin.

In the field of the invention, the following documents have also been consulted.

Document EP 0 120 803, equivalent to Document U.S. Pat. No. 4,568,244, describes a main rotor hub for a helicopter having a composite matrix of reinforcing fibers and epoxy. That hub made of composite material is provided with sockets, each having a radial thrust seat with a flat bearing surface for supporting a respective blade.

Document EP 0 340 095, equivalent to Document U.S. Pat. No. 4,915,585, describes a rotor hub made of composite material that is substantially cross-shaped, but without specifically describing the connection between its outer radial strength member and the margin of the hub.

Document FR 2 653 405, equivalent to Document U.S. Pat. No. 5,141,398, describes a lead/lag damper and resilient return device for rotorcraft rotor blades. Each blade of the rotor has a root whereby the blade is coupled to a hub that is itself driven in rotation about an axis of the rotor. A thin ring of viscoelastic material possesses internal and external walls that are bonded respectively to an internal strength member and to an external strength member. The external strength member presents a lever having hinged thereto via a ball joint a rigid rod that has a ball joint for constraining the rod to move with the root of the blade. The internal strength member is secured to a support that is driven by the hub.

Document GB 2 092 541, equivalent to Document U.S. Pat. No. 4,425,082, describes a composite hub for a helicopter rotor. That hub is made up of a plane plate having passing therethrough a series of openings that are uniformly distributed around its periphery. Each of the openings is suitable for receiving a flexible coupling providing a connection with an associated blade. The plate presents a laminated structure including a force distributor element in a middle layer. Radial leaf elements are arranged on either side of the distributor element and extend in planes perpendicular to the axis of rotation. Each annular leaf element is disposed on either side of the distributor element and comes into contact with the free ends of the associated series of radial elements.

Document U.S. Pat. No. 4,818,179 describes a hub for a helicopter rotor having a main retention plate. A peripheral ring of composite material presents reinforcing fibers that are oriented in the plane of the plate and perpendicularly to the retention plane. Other fiber reinforced rings are spaced apart perpendicularly to the central axis of the hub. Those rings form a flat tubular circumferential structure that surrounds the peripheral ring. An annular frame essentially comprises circumferential fibers that are interlinked with fibers that are inclined at a predetermined angle.

Document U.S. Pat. No. 5,478,204 describes a rotary wing aircraft rotor having a ring for supporting pitch bearings. That ring includes an upper cap and a lower cap. Various materials are proposed for the rotor, e.g. resin, epoxy, or reinforced thermoplastic resin.

Nevertheless, the conditions in which such composite materials are used for making the hub of a rotorcraft rotor having flexible branches that contribute to enabling the blades to move relative to the hub are limited in particular to rotorcraft of the light category. For rotorcraft of heavier categories in which the rotors support forces that are considered as being large, the blades are preferably mounted on a hub that is robust and rigid by means of a hinge system, such as a ball joint hinge providing the blades with freedom to move in multiple directions on the hub.

By way of example, such a ball joint hinge is provided by using a laminated elastomer body that incorporates metal laminations, commonly referred to as a "spherical thrust bearing". Such an elastomer/metal laminated body is incorporated with an assembly strength member and is located between the hub and the blade root of a blade under consideration, being placed so as to bear against the hub in order to allow the blades freedom to move relative to the hub by virtue of the laminated body deforming.

It can be understood that in such a context of mounting blades on the hub by means of a hinge system, the material constituting the hub is conventionally selected to be a metal.

Using composite materials to form such a hub commonly involves the need to reinforce the hub against its own deformation under operating conditions.

Such reinforcement of the hub is commonly performed by placing a metal belt around the hub, which presents the main drawback of increasing the weight of the hub and of making it more complex to produce.

In addition, the volume of the hub needs to be increased in order to provide the looked-for robust mounting of blades with freedom to move relative to the hub by means of said hinge systems.

Such an increase in volume makes it necessary not only to extend the hub in thickness, where thickness is considered along the axially-extending direction of the hub, but also in diameter in order to impart robustness to the hub, enabling it to withstand the forces to which it is subjected in operation and relative to the ways in which it is connected firstly to the rotary shaft and secondly to the blades.

BRIEF SUMMARY OF THE INVENTION

In this context, the object of the present invention is to provide a rotorcraft rotor having a hub made of composite materials in an arrangement that is adapted to mounting the blades with freedom to move relative to the hub by means of hinge systems.

More particularly, it is desired to obtain such a composite material hub at reduced cost, the hub extending as little as possible both axially and diametrically, while avoiding any need to reinforce the hub against its own deformation in operation, in particular by means of a belt, and restricting as much as possible any machining operations that need to be performed after the hub has been fabricated by molding.

The composite materials constituting the hub need to be selected not only because of the advantages that can be obtained by techniques for fabricating such composite materials, but also seeking to obtain ways of using such composite materials that enable the hub to be structured at reduced cost.

In addition, such structuring desired for the hub must comply with the constraints specified above, in particular by avoiding making it heavier.

In this context, the present invention sets out to form the hub from composite materials obtained firstly from layers of fabric made of fibers that are selected to be carbon fibers and secondly making use of a polymer that is selected from thermoplastic resins. Selecting such composite materials makes it possible to ensure that the hub can perform the functions it is required to perform and makes it possible to provide specific appropriate arrangements to its structure providing solutions within the overall context of the constraints that are identified and set out above.

In this context, the rotorcraft rotor of the present invention relates mainly to rotorcraft rotors comprising a hub made of composite materials obtained as a stack of successive layers of mineral fiber fabric impregnated with a resin.

The hub is mounted coaxially about a rotary shaft for driving the hub in rotation, said rotary shaft extending through a bore in the hub. The hub also has a plurality of branches extending radially from the bore, which branches have respective blades individually mounted thereon. Said blades are mounted on the hub so as to be individually movable at least in order to vary blade pitch, and possibly also to perform flapping and/or lead/lag movement, in particular if the rotor is a main rotor of a rotorcraft.

According to the present invention, such a hub comes within the known context whereby the blades are individually mounted to be movable relative to the hub by means of respective hinge systems. Each such hinge system includes a mounting strength member for mounting it on a respective one of the branches of the hub.

Said strength members bear radially against said branches, being individually housed at least in part in respective sockets that extend along the axially-extending direction in a monolithic body.

In such a context to which the hub of the present invention belongs, it is selected to form the hub essentially from a monolithic body of composite material obtained by stacking successive layers of carbon fiber fabric dusted in a thermoplastic resin, advantageously making use of a technique of compressing said layers under high pressure and while hot in a press.

Such composite materials make it possible to form the monolithic body using a fabrication method in which the carbon fibers incorporated in the fabric layers are dusted with said thermoplastic resin, such as polyetheretherketone (PEEK), which then makes it easier to fabricate the monolithic body by handling the fabric layers, which are then considered not to be sticky. Such ease of handling is particularly useful insofar as obtaining said monolithic body requires a considerable number of layers to be stacked, by way of indication a number in the range 200 to 400.

In addition, the composite materials that are selected make it possible to obtain said monolithic body by compressing said layers of fabric at a pressure of about 60 bars and at a temperature of about 400° C.

The resulting monolithic body is sufficiently robust to withstand the forces to which the hub is subjected in operation. In addition, the selected composite materials make it possible at reduced cost to solve the problems that arise as a result of using composite materials in a hub when mounting blades on the hub by means of independent respective hinge systems fitted to the hub.

In addition, it is found that the composite materials selected in accordance with the present invention make it possible, by molding, to form said sockets in said monolithic body for receiving respective strength members of said hinge systems. It is found that such sockets can be provided directly by molding without any need for subsequent machining operations, which are expensive, in order to form appropriate bearing surfaces for the blades against the hub.

It should be observed that the thermoplastic resin, in particular PEEK, that is selected in accordance with the present invention for impregnating the fabric forming the composite materials from which the hub is made presents mechanical strength characteristics that are better than those of the thermosetting resins, in particular epoxy resin, as conventionally used for forming a composite material hub.

In addition, such a thermoplastic resin does not include any solvent, thereby having the advantage of being recyclable and better for preserving the natural environment.

Nevertheless, the composite materials constituting the monolithic body need to be selected so as to take account of the problem specific to forming a rotorcraft rotor hub out of composite materials, namely the problem of the hub being subjected to the centrifugal force that is generated by driving the rotor, which tends to deform the hub.

In such a context of taking account of deformation of the sockets under the effect of the rotor being set into rotation, the sockets are shaped as fabricated so as to form a radial thrust seat for enabling the strength members to bear against the branches via a bearing surface that is cylindrical under the effect of the rotor being set into rotation at a predefined operating speed.

Said cylindrical bearing surface is defined in particular by a base that is oriented orthogonally to the radial direction in which the strength members bear against the branches, being of a generally arcuate shape, e.g. having the shape that may equally well be an arc of a circle or an arc of an ellipse.

Said radial thrust seat with a cylindrical bearing surface extends in particular along a generator line oriented in the axially-extending direction of the hub and complementary in shape to a given cylindrical bearing surface of the strength member.

Naturally, the concept of "as fabricated" involves taking into consideration the state of the monolithic body on being fabricated, i.e. ignoring the resulting stress to which it is applied in operation on board a rotorcraft and in particular as a result of the rotor being set into rotation and/or of the blades being controlled to move relative to the hub.

As a result, in order to obviate the deformation of said sockets under the effect of the centrifugal force that is applied to the hub in operation, the as fabricated shape of the sockets advantageously takes account of such deformation of the socket in order to provide said thrust seat beside the socket that unusually has a cylindrical bearing surface.

Such a cylindrical bearing surface for said thrust seat provides robust radial bearing for the strength member against the socket while the rotor is in operation.

By means of these provisions, the radial extent of the branches can then advantageously be reduced without affecting the way the blades are held robustly with freedom to move and without any need to reinforce the ability of the hub to retain its shape, such as for example by using the known technique of putting a metal belt around the hub so as to prevent it deforming in operation, but presenting the drawback of being heavy.

Furthermore, it is then possible to choose to reduce the thickness of the hub progressively from its axial zone where it is connected to the rotary shaft going towards its periphery, so as to better reduce its weight and overall size while conserving robust retention of the blades with freedom to move relative to the hub.

It is easy to fit wedges in order to compensate for the slope of the end faces of the hub against which the strength member in particular comes to bear. Advantage may be taken of the reversible nature of the polymerization of the thermoplastic resin in order to incorporate such wedges in the monolithic body by molding, and more particularly by overmolding.

In an embodiment that enhances the as fabricated shape of the sockets changing to the shape of the sockets while the rotor is in operation, the profile of the sockets in the diametral plane of the hub is generally oblong in shape, with the small dimension of such an oblong shape extending in particular in the radially-extending direction of the monolithic body.

Such a generally oblong shape for the profile of the sockets is imparted to the sockets in particular by their profile in the diametral plane of the hub having a shape that is defined by a plurality of successive mutually tangential circular arcs, in particular at least four such arcs, with two successive circular arcs presenting different radii of curvature.

Such a profile for the sockets defines a circular arc in the diametral plane of the hub, which arc presents the surface portions of a socket for forming said radial thrust seat whereby a strength member bears against the branch. A first radius of said circular arc as defined by fabrication is greater than a second radius that is imparted to said circular arc under the effect of the rotor being set into rotation at said predefined operating speed, said second radius in the operating situation of the rotor defining said radial thrust seat with a cylindrical bearing surface whereby the strength member bears against the branch.

By way of indication, in order to define the first radius of said circular arc as defined on fabrication, it is ensured in particular that, when the rotor is in operation, the pressure exerted between the monolithic body and the strength member is less than an acceptable pressure, e.g. as defined by performing tests on test pieces. It has been found that the cylindrical bearing surface of said radial thrust seat advantageously enables said pressure to be distributed in optimum manner.

When the rotor is not rotating, the radius of the portion of the strength member that bears radially against the branch is smaller than the radius of the circular arc of the socket that, on fabrication, defines said radial bearing seat with a cylindrical bearing surface for the strength member to bear against the corresponding branch. As a result of the centrifugal force produced by setting the rotor in rotation, the hub deforms and the radius of the circular arc of the socket decreases until it matches the radius of the cylindrical bearing surface of the strength member where it bears against the corresponding branch, thereby obtaining the looked-for distribution of pressure.

In order to improve the axial extent of the cylindrical bearing surface whereby the strength member bears radially against the branch, it is also proposed to avoid the monolithic body having unmolding tapers along the surface portions of the sockets that form the radial thrust seats for the strength members against the branches.

The tapers needed for unmolding the monolithic body are then arranged on the surface portions of the sockets that are complementary to the surface portions of the sockets forming said radial thrust seats for the strength members bearing against the branches.

The monolithic body of the present invention is suitable for being used in the known context in which each of said strength members comprises an elastomer/metal laminated body providing the blade with freedom to move in multiple directions relative to the hub. Such strength members are typically placed to thrust radially against respective branches.

Under such circumstances, it is proposed to shape the surface of the bearing surface between a strength member and a branch in an unusual manner as a bearing surface that is cylindrical, being defined by a generator line oriented in the axially-extending direction of the hub.

In the preferred situation, where at least one of the axial end faces of said monolithic body is inclined at least in part relative to the plane of rotation of the hub, the monolithic body is advantageously provided with wedges of the kind mentioned above. Such wedges are wedges for compensating the slope that results from said at least one axial end face of the monolithic body being inclined, said wedges providing axial thrust seats on the hub to enable the strength members to bear against the branches.

As mentioned above, advantage is taken of the thermoplastic resin to incorporate said wedges in the monolithic body by molding, thereby avoiding any need to damage the monolithic body by using fastener members, such as screws, for example, for the purpose of mounting wedges on the monolithic body in order to compensate a slope given to the axial end faces of the monolithic body.

More particularly, the wedges are advantageously incorporated in the monolithic body by overmolding, the wedges advantageously being obtained from composite materials incorporating mineral fibers, such as glass and/or carbon fibers, for example, embedded in a thermoplastic resin.

In variants, the wedges may be made using composite materials. Such composite materials may be formed by stacking layers of mineral fiber fabric that are embedded in a thermoplastic resin, or indeed they may be formed using an agglomeration of mineral fibers embedded in a thermoplastic resin.

In particular for a main rotor, the blades may also be mounted on the hub with freedom to perform lead/lag movement about respective lead/lag axes. Under such circumstances, each peripheral end face of the branches is preferably provided with a protector member, such as a protector member formed by a wear part or indeed formed by an abutment member for limiting the lead/lag stroke of each blade.

In order to strengthen the assembly of such protector members, each of them is preferably fitted with fastener tabs that bear respectively against the axial end faces of the monolithic body.

Such fastener tabs, e.g. each arranged as a yoke bearing against both of the axial end faces of the monolithic body, may be fastened to the peripheral end of the corresponding branch by first fastener members, such as screws or bolts, for example, which members extend through respective first passages formed in the monolithic body along its axially-extending direction.

Account should be taken of the fact that the composite materials selected for forming the hub advantageously enable the monolithic body to be shaped in compliance with the following provisions, considered singly or in combination:

the monolithic body is of thickness that decreases progressively from an axially-central zone in which at least said bore is provided, towards the outer margin of a peripheral zone of the monolithic body incorporating the branches. Shaping the hub in this way imparts appropriate robustness thereto without weakening the connection with freedom for relative movement between the blades and the hub.

the monolithic body is symmetrical on either side of a diametral plane that is an axial midplane, thus making it possible to avoid irregular distortions to the shape of the hub in operation.

the branches project towards the periphery of the monolithic body, with the projecting portions of the branches presenting a radially-extending dimension that is advantageously small, by way of indication lying in the range 0.2 to 0.3 times the outside diameter of the monolithic body. In this context, and considering one given branch, the distance between the peripheral end of that branch and the radial thrust seat for its strength member to bear against that branch is small, by way of indication lying in the range 0.1 to 0.15 times approximately the outside diameter of the monolithic body.

Such provisions for a small radial extent for the projecting portions of the branches enable the branches to be reinforced against deformation while limiting the outside diameter and the weight of the hub. Limiting the radial extent of the branches also makes it possible to reduce the extent, in a direction that is radial relative to the hub, of the blade root that serves to mount the blades on the branches of the hub, thereby having the advantage of improving the robustness with which the blades are mounted on the hub.

It should be observed that such compactness of the monolithic body obtained by limiting the radial extent of its branches is made possible in particular by the above-mentioned account that is taken of the way the sockets deform when the hub is set into rotation.

More particularly, in a specific embodiment of the hub, said monolithic body comprises:
- the axially-central zone of constant thickness having formed therein at least the bore and second passages that are oriented in the axially-extending direction of the hub and that are distributed in a margin around the bore. Said second passages receive second fastener members, such as screws or bolts, for example, for fastening the hub to at least one plate of the rotary shaft that is placed facing either one of the axial end faces of the hub.
- the peripheral zone that extends said central zone radially while decreasing progressively in thickness towards its periphery from the thickness of said axially-central zone. Said peripheral zone includes at least a portion of each of said sockets for receiving respective strength members and also includes third passages oriented in the axially-extending direction of the hub. Such third passages receive third fastener members, such as screws or bolts, for example, for fastening the strength members to the hub. Such third passages are provided in particular to pass through said wedges, if any, against which the strength members bear axially.

More particularly, the sockets are preferably provided with a first portion in said axially-central zone and a second portion in said peripheral zone of the monolithic body.

In this context, said second portion then includes the surface portion of the sockets that forms said radial thrust seat for the strength member against the branch, it being specified, if necessary, that the radial thrust of a strength member against the corresponding branch is directed towards the periphery of the hub.

The composite materials that are selected to form the monolithic body, and also the preferred ways of fabricating it, as mentioned above, make it possible to arrange the hub so that:
- the thickness of the monolithic body at its periphery lies in the range 30% to 40% approximately of the thickness of the monolithic body in its axially-central zone; and
- the outside diameter of the monolithic body lies in the range six to ten times approximately the thickness of the monolithic body in said axially-central zone.

It should be observed that as a result of the conditions whereby the monolithic body is molded from the selected composite materials and as a result of the secondary provisions proposed by the invention whether considered in isolation or in combination, the machining operations that are performed on the monolithic body after it has been molded can be limited to a considerable extent.

Such machining operations may be restricted to machining voids that are made by molding to extend across the thickness of the monolithic body, such voids forming said first passages, said second passages, and/or said third passages. After being machined, said voids may then advantageously be provided with reinforcing rings that are fitted to and incorporated in the monolithic body, in particular by sealing.

In a variant, said machining operations may be restricted to machining the inside recesses of such reinforcing rings that have previously been installed inside said voids. Under such circumstances, the reinforcing rings may advantageously be incorporated in the monolithic body by overmolding, taking advantage of the reversible nature of the polymerization of the thermoplastic resin.

Such voids are provided in particular jointly with the optional forming of the sockets, in particular by taking advantage of the technique of stacking layers of carbon fiber fabric dusted with thermoplastic resin on cores that respectively provide said voids and/or sockets through the monolithic body.

Consequently, it is then possible to take advantage of the reversible nature of the polymerization of the thermoplastic resin to provide said reinforcing rings equally well in said first passages and/or said second passages and/or said third passages, said reinforcing rings advantageously being incorporated in the monolithic body by overmolding.

Furthermore, said second passages open out in particular into both of the axial end faces of the hub, with the second fastener members preferably extending through the hub and potentially co-operating with a pair of plates of the rotary shaft that are located respectively facing each of the axial end faces of the hub in order to increase the robustness of the junction between the hub and the rotary shaft.

BRIEF DESCRIPTION OF THE SEVERAL VIEWS OF THE DRAWINGS

An embodiment of the present invention is described with reference to the figures of the accompanying sheets, in which.

DETAILED DESCRIPTION OF THE INVENTION

Figure 1:
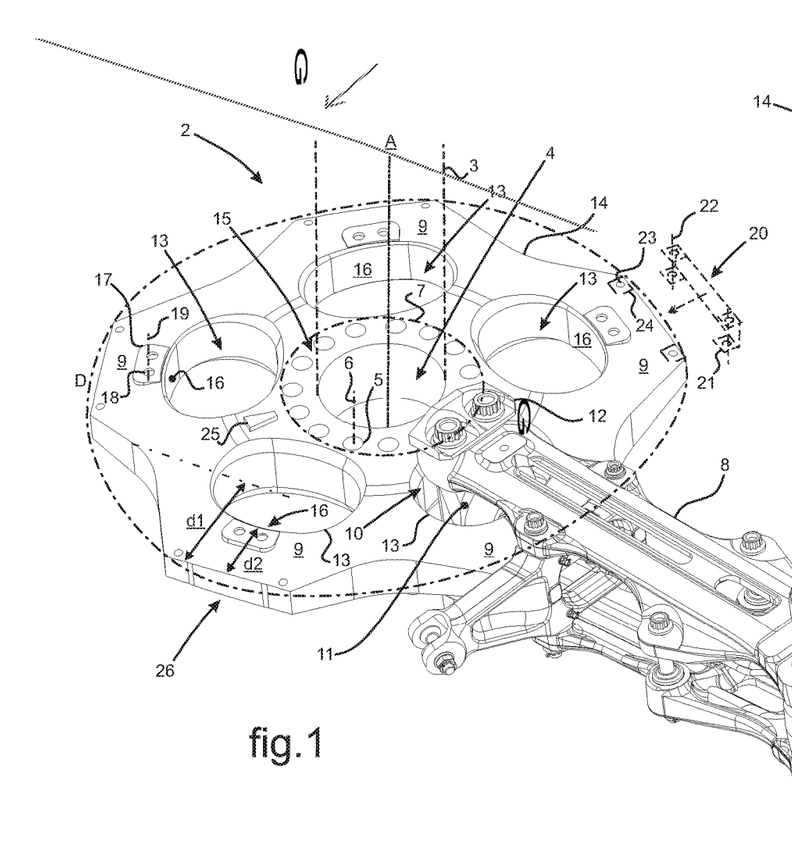
FIG. 1 is a perspective view of a rotorcraft rotor in an embodiment of the present invention.

In FIG. 1, a rotorcraft G is represented diagrammatically. The rotorcraft G has a rotor. This rotorcraft rotor has blades 1 (only one blade is shown in part) that are mounted on a hub 2. In order to be driven in rotation, the hub 2 is mounted on a rotary shaft 3 extending coaxially through a bore 4 of the hub. Such a rotary shaft 3 is constituted in particular by a mast for the main rotor of a rotorcraft, as shown.

The hub 2 has second passages 5 arranged in a margin around the bore 4, in order to receive second fastener members 6 such as screws or bolts for fastening the hub 2 to at least one plate 7 of the rotary shaft 3.

The blades 1 are mounted on the hub 2 so as to be movable, at least so as to vary in pitch, and possibly also so as to vary in lead/lag and in flapping, as in the embodiment shown. For this purpose, each blade 1 is conventionally provided with a blade root 8 for assembly to a respective branch 9 of the hub 2. In a common embodiment, the blades 1 are made to be movable relative to the hub 2 by means of a hinge system 10 interposed between a given blade root 8 and the hub 2.

Figure 4:
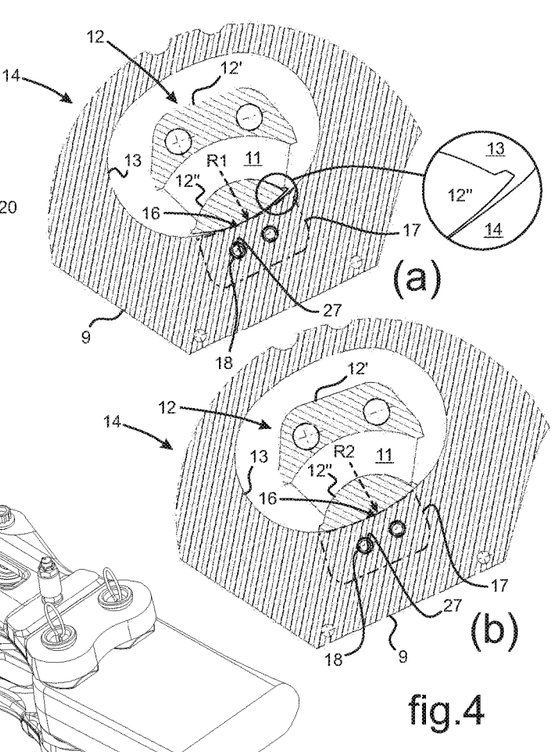
FIG. 4 comprises two diagrams (a) and (b) showing, in its general plane, a fragment of the monolithic body shown in FIGS. 2 and 3.

In the example shown in FIGS. 1 and 4, such a hinge system 10 is of the type making use of a laminated elastomer/metal body 11 comprising metal laminations and layers of elastomer, and commonly referred to as a "spherical thrust bearing". The laminated elastomer/metal body 11 is incorporated in a strength member 12 whereby the hinge system 10 is mounted between a given blade root 8 and the hub 2.

The hub 2 has sockets 13 respectively housing the strength members 12. A given strength member 12 uses bolts to connect a blade root 8 to the hub 2, while bearing axially against the axial end faces of the hub 2.

As shown in FIG. 4, the strength member 12 may for example be of the type comprising at least one said elastomer/metal laminated body 11 interposed between two strength member elements 12', 12". The elastomer/metal laminated body 11 is compressed between the strength member elements 12', 12", an "outer" strength element member 12" bearing radially against the corresponding branch 9. Consequently, by bearing radially against the hub 2 via its outer strength member element 12", the elastomer/metal laminated body 11 deforms so as to allow the blade root 8 to move relative to the hub 2.

It should be observed at this point that the concept "axial", and consequently the concepts "diametral" and/or "radial" are to be considered relative of the axis of rotation A of the hub 2. In this context, it should be understood that the thickness of the hub 2 is to be considered along axially-extending direction.

The hub 2 is essentially constituted by a monolithic body 14 made by molding a stack of layers of carbon fiber fabric dusted with a thermoplastic resin, said fabric layers being stacked inside a mold and then compressed while hot and at high pressure.

Figure 2:
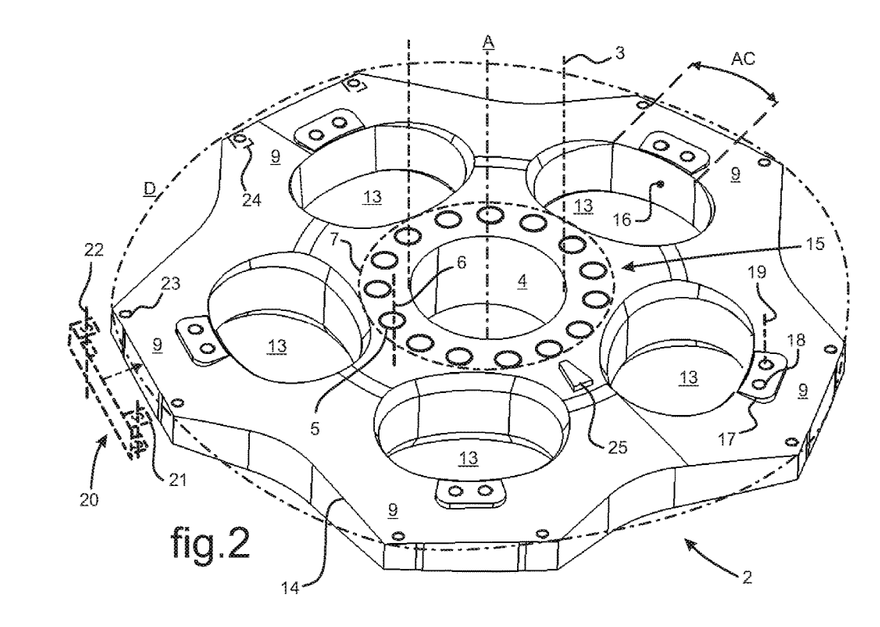
FIGS. 2 and 3 are views of an embodiment of a monolithic body essential forming a hub of the rotor shown in FIG. 1, shown respectively in perspective and in axial section.
Figure 3:
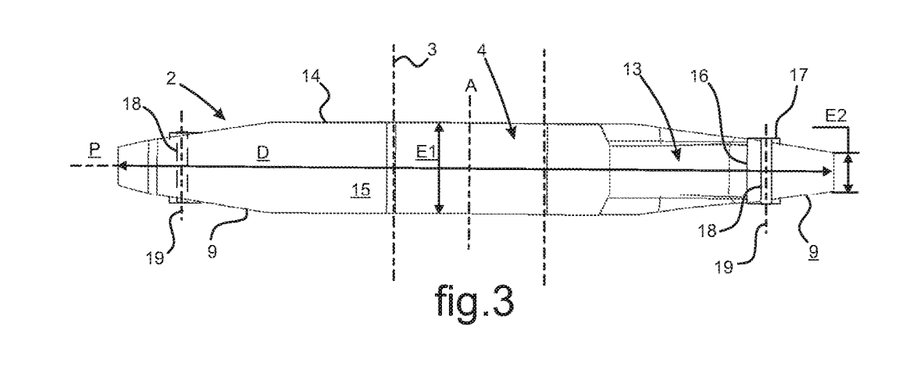

In FIGS. 1, 2, and 3, the monolithic body 14 has an axially-central zone 15 containing the bore 4 and said second passages 5. Said axially-central zone 15 is extended diametrically by a peripheral zone including the branches 9, at least in part.

As can be seen more particularly in FIG. 3, the monolithic body 14 is symmetrical about a diametral plane P constituting an axial midplane. The axially-central zone 15 of the monolithic body 14 is of constant thickness E1, thereby enhancing thrust engagement of the hub against the plate(s) of the rotary shaft.

The peripheral zone of the monolithic body is of thickness E2 that decreases progressively going towards its periphery from the axially-central zone 15. The thickness E2 of the monolithic body 14, when considered at its periphery, is about 30% to 40% its thickness E1 considered in its axially-central zone 15. As can be seen more particularly in FIG. 3, the outside diameter D of the monolithic body 14 is about eight times its thickness E1 as considered in the axially-central zone 15.

Furthermore, in FIGS. 1 to 4, the sockets 13 provide radial thrust seats 16 with cylindrical bearing surfaces for the strength members 12 to bear against the branches 9, in particular via the elastomer/metal laminated bodies 11 with which they are fitted.

As shown in FIG. 1, the radially-extending dimension d1 of the projecting portions 26 of the branches 9 towards the periphery of the monolithic body 14 lies in the range approximately 0.2 to 0.3 times the outside diameter D of the monolithic body 14, with a separation distance d2 between the peripheral ends of the branches 9 and the radial thrust seats 16 where the strength members 12 bear against the branches 9 lying in the range approximately 0.1 to 0.15 times the outside diameter D of the monolithic body 14, for any given branch 9.

As shown in FIG. 2, the sockets 13 are generally oblong in shape, each defining respective circular arcs AC providing the surface portions of the sockets 13 that form said radial thrust seats 16 via which the strength members 12 bear against the branches 9.

Nevertheless, as shown in FIG. 4, the sockets 13 tend to deform under the effect of centrifugal force when the rotor is set into rotation. More particularly, in diagram (a), the monolithic body 14 is shown when the hub is stationary, whereas in diagram (b) the monolithic body 14 is shown in the situation in which the hub is rotating. As a result of the sockets 13 deforming, the initial radius defined on fabrication for said circular arcs, and as shown in the diagram (a), tends to become smaller so as to match the radius of the surfaces of the strength members 12 that bear radially against the branches 9, as can be seen in diagram (b).

In this context, a first radius R1 of said circular arc AC is defined on fabrication to be greater than a second radius R2 of said circular arc AC as identified under conditions of the rotor rotating at its nominal operating speed. Said first radius R1 for the circular arc AC is identified, in particular by testing, so that by deformation the sockets 13 give said circular arc AC the second radius R2 that is at least substantially equal to the radius of the cylindrical surfaces of the elastomer/metal laminated bodies 11 bearing against the branches 9 via the strength members 12.

Furthermore, and as can be seen more particularly in FIGS. 1 and 2, in order to optimize the thrust surfaces whereby the strength members 12 bear against the branches 9, both radially and axially, it is proposed to ensure that the portions of the surfaces of the sockets 13 that define said respective radial thrust seats 16 whereby the strength members 12 bear against the branches 9 are to be free of any taper.

As can be seen more particularly in FIG. 3, the end faces of the monolithic body 14 are preferably inclined, as mentioned above, so as to reduce the thickness of the branches 9 at the periphery of the hub.

In this context, and as shown in FIGS. 1 to 4, the axial end faces of the monolithic body 14 are provided with wedges 17 for compensating their slope in order to strengthen the axial seat whereby each strength member 12 bears against the hub 2. Such wedges 17 are obtained from composite materials incorporating thermoplastic resin that enables the wedges 17 to be incorporated in the monolithic body 14, in particular during an overmolding operation.

In FIGS. 1 to 3, the monolithic body 14 includes third passages 18 arranged axially through the monolithic body 14 and passing through the wedges 17. Third fastener members 19, such as bolts, extend through the third passages 18 in order to fasten the strength members 12 to the monolithic body 14, via said outer strength member elements 12" connecting the blade roots 8 to the hub 2.

The blades are also mounted to be movable in lead/lag relative of the hub.

In this context, the peripheral end faces of the branches 9 have protector members 20, as may be constituted by wear parts and/or by abutment members for limiting the lead/lag stroke of each blade.

By way of example, such protector members 20 may comprise fastener tabs 21 bearing respectively against the axial end faces of the monolithic body 14.

The protector members 20 are fastened to the monolithic body 14 by first fastener members 22, e.g. such as bolts, extending through first passages 23 formed through the branches 9 at the margins of their peripheries in the radially extending direction of the hub.

Auxiliary wedges 24 may potentially be interposed between the fastener tabs 21 and the axial end faces of the monolithic body 14 in order to compensate for the slopes of the axial end faces of the branches 9.

Such auxiliary wedges 24 are potentially incorporated in the monolithic body 14 during molding, and more particularly during overmolding, by incorporating a thermoplastic resin in the same manner as for the wedges 17 against which the strength members 12 bear axially against the monolithic body 14.

Also by way of example, the auxiliary wedges 24 could each be made of a flexible mass, e.g. made of elastomer, that is compressed to a greater or lesser extent by the first fastener members 22 when installing the protector members 20 on the branches 9. Such flexible masses could possibly be incorporated in the monolithic body 14 and/or the protector member 20.

The various passages 5, 18, and 23 are formed by leaving voids in the monolithic body 14 while it is being molded and by housing reinforcing rings inside said voids, such as reinforcing rings similar to the reinforcing rings 27 that can be seen in the diagrams (a) and (b) of FIG. 4 that are housed inside the third passages 18. The operations of machining the monolithic body 14 can then potentially be limited to machining said voids prior to installing reinforcing rings such as 27 inside the voids by sealing.

In an advantageous variant, the reinforcing rings such as 27 may be incorporated in the hub by overmolding and the operations of machining the monolithic body 14 may then possibly be limited to machining the inside recesses of said reinforcing rings such as 27.

In FIG. 2, there can also be seen a keying member 25 to enable an operator to install the hub 2 on the rotor in a predefined orientation for its axial end faces that face the fastener plate(s) 7 of the rotary shaft 3.

What is claimed is:

1. A rotorcraft rotor having a hub made of composite material obtained by stacking successive layers of mineral fiber fabric that are impregnated with a resin, the hub firstly being mounted coaxially around a rotary shaft extending through a bore in the hub, and secondly including a plurality of branches extending radially from the bore, which branches have respective individual blades mounted thereon, the blades being individually mounted to be movable relative to the hub at least for varying pitch; wherein:
   the hub is formed essentially by a monolithic body of composite materials obtained by stacking successive layers of carbon fiber fabric dusted with a thermoplastic resin and compressed while hot;
   the blades are individually mounted to be movable relative to the hub by respective hinge systems, each having a respective assembly strength member for assembling to a respective one of the branches, the strength member bearing radially against the branches while being individually housed at least in part in respective sockets of the monolithic body, extending in its axially-extending direction; and
   the sockets being deformable under the effect of the rotor being set into rotation, the shape of the sockets is defined on fabrication so as to form a radial thrust seat enabling the strength members to bear against the branches via respective bearing surfaces that become cylindrical under the effect of the rotor being set into rotation at a predefined operating speed, the radial thrust seat having a cylindrical bearing surface extending along a generator line oriented in the axially-extending direction of the hub and being of shape that is complementary to a given cylindrical bearing surface of the strength member.

2. A rotorcraft rotor according to claim 1, wherein the profile of each socket in the diametral plane of the hub is generally oblong in shape, defining a respective circular arc providing the surface portion of the socket that forms the radial thrust seat whereby the strength member bears against the branch; and wherein a first radius of the circular arc as defined by fabrication is greater than a second radius that is imparted to the circular arc under the effect of the rotor being set into rotation at the predefined operating speed, the second radius in the operating situation of the rotor defining the radial thrust seat with a cylindrical bearing surface whereby the strength member bears against the branches.

3. A rotorcraft rotor according to claim 1, wherein the portions of the surfaces of the sockets that form radial thrust seats for enabling the strength members to bear against the branches are free from any tapers for unmolding the monolithic body.

4. A rotorcraft rotor according to claim 1, wherein each strength member has an elastomer/metal laminated body providing multidirectional freedom of movement for the blades on the hub, and the strength members are placed respectively to bear radially against the branches via respective cylindrical bearing surfaces defined by generator lines extending in the axially-extending direction of the hub.

5. A rotorcraft rotor according to claim 1, wherein at least one of the axial end faces of the monolithic body is inclined at least in part relative to the plane of rotation of the hub, and the monolithic body is provided with wedges for compensating the slope that results from the inclination of the at least one axial end face of the monolithic body, the wedges providing axial thrust seats on the hub for enabling the strength members to bear against the branches.

6. A rotorcraft rotor according to claim 5, wherein the wedges are incorporated in the monolithic body by molding.

7. A rotorcraft rotor according to claim 6, wherein the wedges are incorporated more particularly in the monolithic body by overmolding, the wedges being obtained from composite materials incorporating mineral fibers embedded in a thermoplastic resin.

8. A rotorcraft rotor according to claim 1, wherein the blades are also mounted to be movable with lead/lag motion relative to the hub, and the peripheral end faces of each of the branches are provided with respective protector members.

9. A rotorcraft rotor according to claim 8, wherein the protector member may equally well be formed by a wear part and/or by an abutment member limiting the individual lead/lag stroke of a blade.

10. A rotorcraft rotor according to claim 8, wherein each of the protector members is fitted with fastener tabs bearing respectively against the axial end faces of the monolithic body, and being fastened to the peripheral end of the corresponding branch by first fastener members extending through respective first passages provided in the monolithic body in its axially-extending direction.

11. A rotorcraft rotor according to claim 1, wherein the monolithic body is of thickness that decreases progressively from an axially-central zone in which at least the bore is provided, towards the outer margin of a peripheral zone of the monolithic body incorporating the branches.

12. A rotorcraft rotor according to claim 1, wherein the monolithic body is symmetrical on either side of a diametral plane that is an axial midplane.

13. A rotorcraft rotor according to claim 1, wherein the branches project towards the periphery of the monolithic body, and the projecting portions of the branches present a radially-extending dimension lying in the range 0.2 to 0.3 times the outside diameter of the monolithic body, and with reference to a given branch, the distance between the peripheral end of a branch and the radial thrust seat whereby a strength member bears against the branch lies in the range 0.1 to 0.15 times the outside diameter of the monolithic body.

14. A rotorcraft rotor according to claim 11, wherein the monolithic body comprises:

the axially-central zone of a constant thickness in which there are provided at least the bore and second passages extending along the axially-extending direction of the hub and distributed in a margin around the bore, the second passages receiving second fastener members for fastening the hub to at least one plate of the rotary shaft placed facing either one of the axial end faces of the hub; and the peripheral zone radially extending the axially-central zone while decreasing progressively in thickness towards its periphery from the thickness of the axially-central zone, the peripheral zone including at least part of each of the sockets for receiving respective strength members and third passages oriented along the axially-extending direction of the hub, the third passages receiving third fastener members fastening the strength members to the hub.

15. A rotorcraft rotor according to claim 12, wherein:
the thickness of the monolithic body at its periphery lies in the range 30% to 40% approximately of the thickness of the monolithic body in its axially-central zone; and
the outside diameter of the monolithic body lies in the range six to ten times approximately the thickness of the monolithic body in the axially-central zone.

16. A rotorcraft rotor according to claim 10, wherein each of the first passages and/or the second passages and/or the third passages may equally well be provided with a respective reinforcing ring.

17. A rotorcraft rotor according to claim 16, wherein the reinforcing rings are incorporated in the monolithic body by sealing.

18. A rotorcraft rotor according to claim 16, wherein the reinforcing rings are incorporated in the monolithic body by overmolding.

* * * * *